United States Patent

[11] 3,604,130

| [72] | Inventor | Bo Forsstrom<br>Skalby, Sweden |
|---|---|---|
| [21] | Appl. No. | 837,095 |
| [22] | Filed | June 27, 1969 |
| [45] | Patented | Sept. 14, 1971 |
| [73] | Assignee | Incentive AB<br>Stockholm, Sweden |
| [32] | Priority | July 5, 1968, Apr. 14, 1969 |
| [33] | | Sweden |
| [31] | | 9342-1968 and 5230-1969 |

[54] CONSTRUCTION SERIES FOR MOLECULAR MODELS
21 Claims, 29 Drawing Figs.

[52] U.S. Cl. .................................................. 35/18 A,
35/34, 46/25
[51] Int. Cl. ..................................................... G09b 23/26
[50] Field of Search ........................................... 35/18 A,
34, 72, 73, 46; 46/23, 24, 25

[56] References Cited
UNITED STATES PATENTS
2,228,736  1/1941  Starworth.................... 35/46

2,308,402  1/1943  Taylor......................... 35/18

*Primary Examiner*—Robert W. Michell
*Assistant Examiner*—L. Anten
*Attorney*—McGlew and Tuttle ABSTRACT: Plural units can be assembled to form models of molecules, and a first unit has the shape of a sphere segment which is larger than a semisphere and has a flat surface formed with a recess and is preferably shell-shaped. A second unit has the shape of a sphere segment which is smaller than a semisphere and has the same radius as the first unit, and the first and second units can be assembled to form a complete sphere. Two of the first units can be assembled so that the spherical surface of one is situated in the recess of the other, thus representing two atoms having their electron clouds intermingled. The units are formed with apertures in their spherical surfaces and with pegs cooperable with the apertures to assemble units to each other.

PATENTED SEP 14 1971

INVENTOR
BO FORSSTRÖM

BY McGlew and Toren
ATTORNEYS

Fig. 9
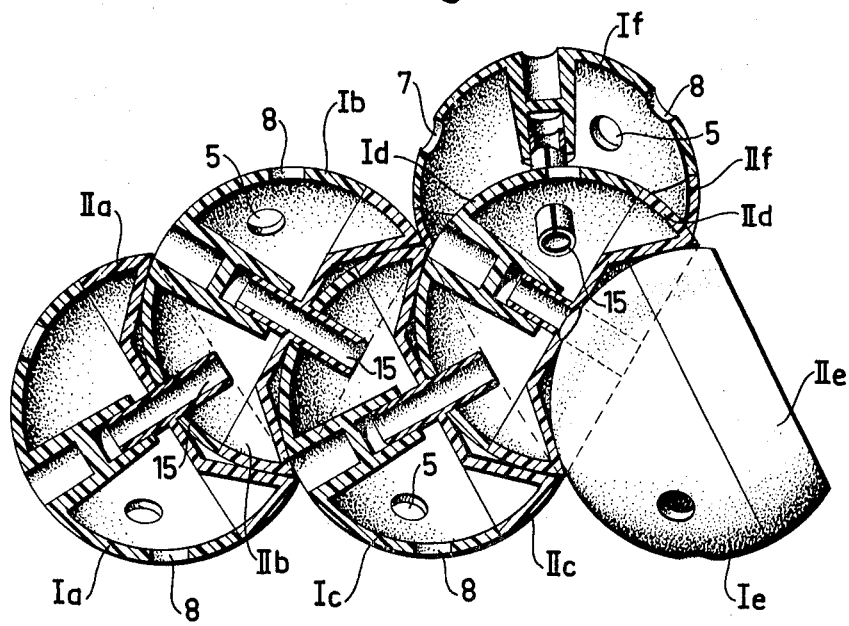
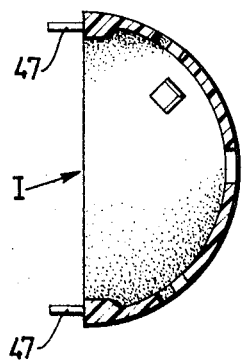
Fig. 10
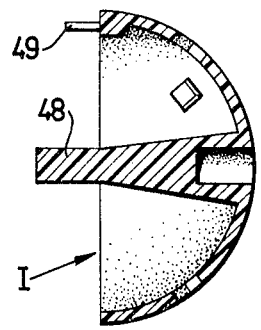
Fig. 11
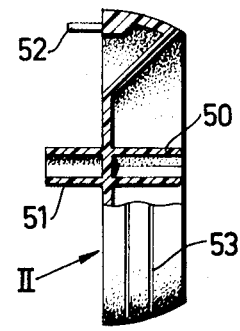
Fig. 12
INVENTOR
BO FORSSTRÖM
BY McGlew and Toren
ATTORNEYS

INVENTOR
BO FORSSTRÖM

INVENTOR
BO FORSSTRÖM

BY Mayllew and Toren
ATTORNEYS

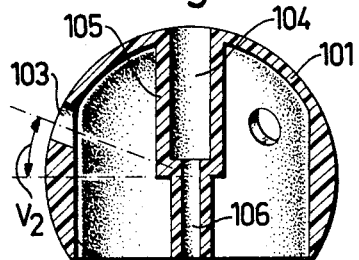
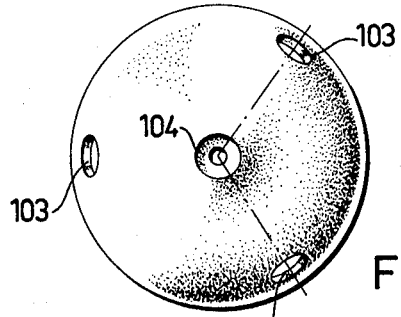
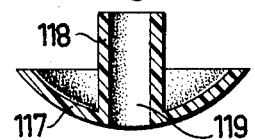
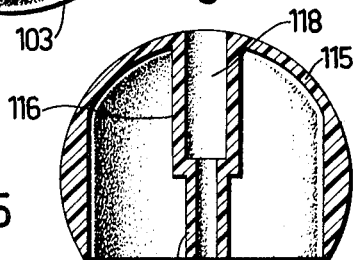
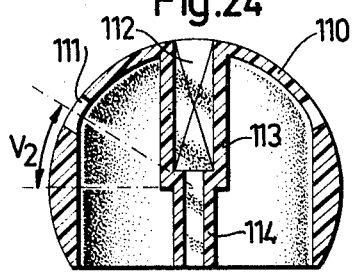
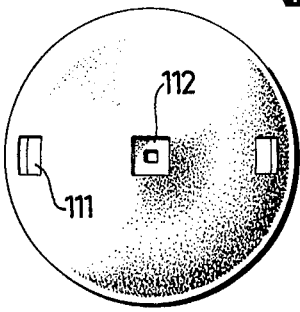
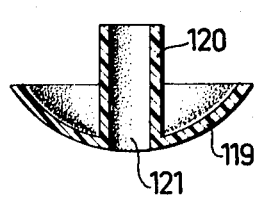
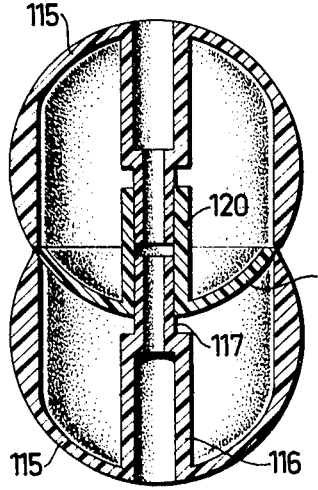
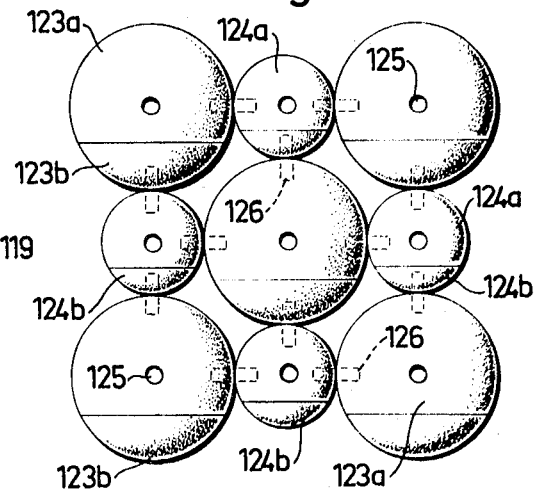

CONSTRUCTION SERIES FOR MOLECULAR MODELS

BACKGROUND OF THE INVENTION

The invention relates to a construction series for molecular models. Such construction series are known in various designs. In one known design the atoms are represented by spheres which are fitted together with the help of pins or rods, either so that two adjacent atoms touch each other or so that they are at a distance from each other. A construction series of this type permits the construction of complicated molecules but the finished molecular model gives a false impression of the molecule because the interatomic distance seen in relation to the diameters of the atoms is greater than in reality. It is known, for instance, that in a molecule the distance between the nuclei of two adjacent atoms is less than the sum of the radii of the two atoms because the electron clouds of the two atoms are intermingled.

In other known types of construction series for molecular models, consideration has been given to the interatomic distance and the separate atom models are made so that, in the finished molecular model, they give the illusion that the electron clouds are intermingled. Usually the atom models are made as spheres which are provided with flat surfaces to be placed against each other when the molecular model is being assembled. However, the difficulty then arises that the construction series must contain atom models of many different designs, since in a molecule a single atom may be linked to different numbers of other atoms and these may also be differently positioned. This can be exemplified with the help of the carbon atom which is the most important atom in organic compounds. In ethane each carbon atom is linked to a second carbon atom and to three hydrogen atoms. In ethylene each carbon atom is linked to a second carbon atom and to two hydrogen atoms. In acetylene each carbon atom is linked to a second carbon atom and to one hydrogen atom. Thus even the assembly of these three simple models necessitates three different types of carbon atoms in a construction series of this type.

SUMMARY OF THE INVENTION

The invention relates to a construction series of the type in which the interatomic distance is substantially correct in relation to the diameters of the atoms, thus giving the impression that the electron clouds intermingle. The object of the invention is to effect a construction series which contains only a few types of units but which, in spite of this, can be used in the construction of models of many different chemical compositions. Another object of the invention is to effect a construction series which is inexpensive to manufacture, partly because, according to the invention, the number of different types of units is small and partly because each unit is cheap to manufacture. It is thus possible to use the construction series according to the invention for teaching purposes.

The construction series according to the invention is characterized in that it comprises three units, namely:

a. a first unit in the form of a semisphere, b. a second unit in the form of a segment of a sphere, the boundary of the segment being formed by a sphere surface and by two parallel surfaces of different sizes, the larger parallel surface having the same size as the flat surface of the semisphere which forms the first unit, and the sphere surface having the same radius as the semisphere which forms the first unit, and also the smaller flat parallel surface being provided with a recess into which a first unit can be partially inserted, c. a third unit which has substantially the shape of a semisphere, which has a smaller radius than the semisphere which forms the first unit, the flat surface of the semisphere which forms the third unit being provided with a recess into which a first unit can be inserted; the three units being provided with assembly means, suitably in the form of holes and pegs, which are arranged so that two semispheres which form the first unit can be assembled to a sphere, a sphere segment which forms the second unit and a semisphere which forms the first unit can be assembled either so that the surfaces of equal area are adjacent to each other or so that part of a semisphere is situated in the recess of the sphere segment, and that a semisphere which forms the third unit can be placed on the surface of a semisphere which forms the first unit in several positions.

A construction series according to the invention need only comprise these three units, each of course being made in considerable numbers, so that the first and the second units are considered to represent, for example, the carbon atom, in which case they are suitably made of black plastic, and the third unit is considered to represent, for example, the hydrogen atom, and is suitably made of white plastic. In order to represent other atoms, the construction series may be supplemented with other units, for example units having the same construction but a different size if it is desired to give some idea of the size of the atoms in relation to each other in the molecular model. However, it is practical to disregard this finesse and make all the units the same size, instead denoting different types of atoms with the help of differently colored units.

BRIEF DESCRIPTION OF THE DRAWINGS

The invention will be further explained in the following with reference to the accompanying drawings.

FIG. 9 illustrates how the first and the second units can be assembled to form a model of a carbon chain.

FIGS. 10 and 11 show two more embodiments of the first unit.

FIG. 12 shows another embodiment of the second unit.

FIGS. 21–29 illustrates units having an alternative form relative to those illustrated in FIGS. 1–20.

FIG. 21 shows an embodiment of a sphere segment of said alternative form in cross section and FIG. 22 the same sphere segment seen from the spherical side.

FIG. 23 shows a sphere segment which, together with the sphere segment according to FIG. 21, may be assembled to form a sphere.

FIGS. 24 and 25 show a different embodiment of the sphere segment of FIG. 21, in cross section and seen from the spherical side.

FIGS. 26 and 27 show two sphere segments which together can produce a model of a hydrogen atom.

FIGS. 28 shows how two sphere segments according to FIG. 26 produce a model of a hydrogen molecule.

FIG. 29 shows how spheres of two different sizes form a model of a cubic crystal lattice.

DESCRIPTION OF THE PREFERRED EMBODIMENTS

Reference shall first be made to the units of the form illustrated in FIGS. 1–20. For the sake of simplicity, in the following description the first unit will be called part I, the second unit part II and the third unit part III.

Figure 1:
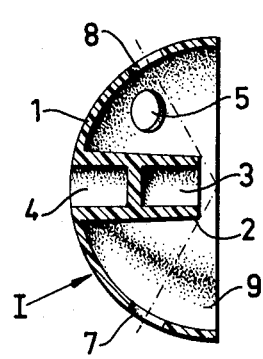
FIG. 1 shows a section through an embodiment of the first unit.

Part I in FIG. 1 consists of a semisphere in the form of a semispherical shell 1. A radially directed peg 2 is arranged centrally in this shell and has a length which is somewhat less than the radius of the sphere. The peg 2 is provided with a recess 3. Five circular holes are arranged in the shell 1, namely a central hole 4 which extends into the peg 2, three equally spaced holes 5–7 and a hole 8 situated between the holes 5 and 6. All the holes 5–8 are at the same distance from the periphery of the semisphere, namely at such a distance that the angle between two lines drawn from the holes 7 and 8 to the center of the semisphere is about 109°. The importance of this will be explained later on.

Figure 2:
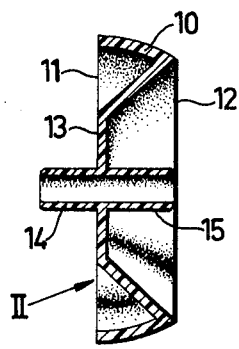
FIG. 2 is a section through an embodiment of the second unit.

Part II according to FIG. 2 consists of a sphere segment, the boundary of which is formed by a spherical surface 10 having the same radius as part I and by two flat parallel surfaces 11 and 12. The larger surface 11 has the same radius as part I. The thickness of the sphere segment, that is the distance between the surfaces 11 and 12, is approximately half the radius of part I. Part II has an inner wall 13, the periphery of which lies at the intersection between the sphere surface 10 and the flat surface 12 and the center of which lies near the flat surface 11, i.e. the wall 13 is concave in relation to the flat surface 12. At the center of this wall 13 is a peg which extends in both directions from the wall, so that a first peg 14 is formed which can be inserted into the recess 3 in the peg 2 of part I, and a second peg 15 which can be inserted into one of the holes 4–8 on part I. So that the pegs 14, 15 can be inserted into the corresponding holes with a certain degree of elasticity, they are designed as tubes with a longitudinal slot.

Figure 3:
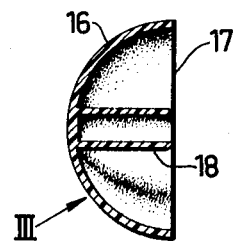
FIG. 3 a section through an embodiment of the third unit.

Part III according to FIG. 3 consists of a semispherical shell 16. A peg 18 is arranged centrally in this shell, which can be inserted into one of the holes 4–8 in part I. Just as the pegs 14, 15, the peg 18 is designed as a tube having a longitudinal slot. The radius of the part III is suitably in the region of ⅔–¾ of the radius of part I, this corresponding approximately to the size of a hydrogen atom in relation to that of a carbon atom. Thus three parts III can be positioned one one part I in the holes 5–7.

Figure 4:
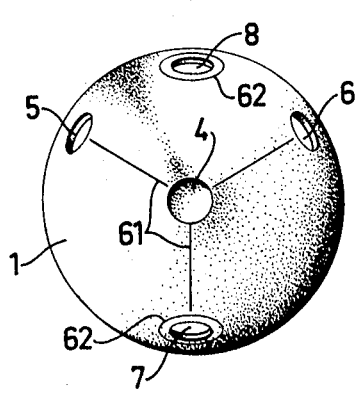
FIG. 4 shows the first unit according to FIG. 1 seen from the spherical side.
Figure 5:
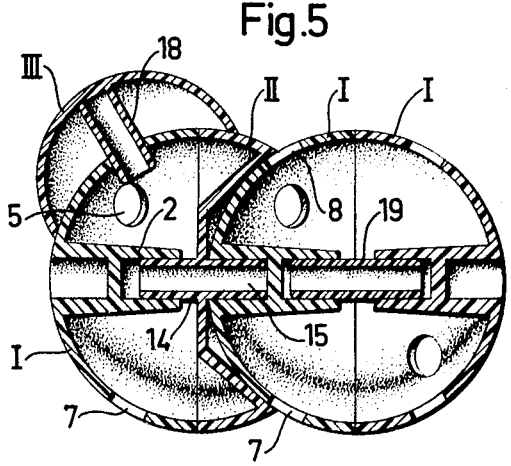
FIG. 5 shows the basic method of assembling the three units.

FIG. 5 shows the general principle of assembly for the three basic units. Two parts I are combined with the help of a peg 19 to form a sphere. A part II has been attached to this sphere by inserting its peg 15 into one of the holes on the surface of the sphere. Yet another part I has been joined to this part II by inserting the peg 14 into the recess on the peg 2. The parts combined in this way represent two carbon atoms with their electron clouds intermingled. The distance between the nuclei of the carbon atoms, seen in relation to the size of the atoms, will be approximately correct since part II has a thickness which is approximately half the radius of part I. A part III is shown attached to one of the carbon atoms, this part generally representing a hydrogen atom. With the hole positioning shown in FIG. 4 it is possible to attach one, two or three hydrogen atoms to each of the two carbon atoms according to FIG. 5.

Figure 6:
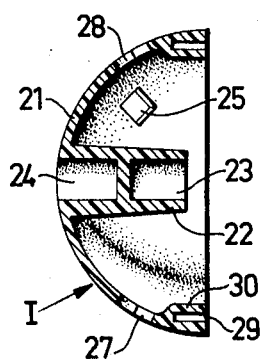
FIGS. 6 and 7 show two other embodiments of the first unit.
Figure 7:
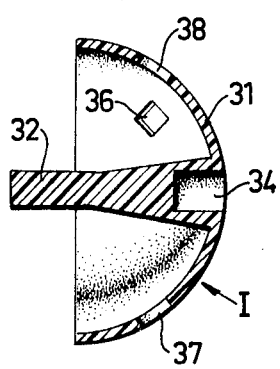

In the embodiment according to FIGS. 1–5 all parts I are similar and when combining two parts I to form a sphere, consequently, an extra peg 19 must be used. FIGS. 6 and 7 show an embodiment of part I where no extra peg is necessary but where instead there are two types of part I. According to FIG. 6 one type of part I consists of a semispherical shell 21 having an internal central peg 22 with a recess 23. Holes 24–28 are arranged on the shell having the same positions as the holes 4–8 according to FIG. 4. However, the holes 24–28 differ from the holes 4–8 in that they have a square shape. At the periphery of the shell 21 are two or more thicker parts 30 in which recesses 29 are arranged parallel to the peg 22. The second type of part I according to FIG. 7 consists of a semispherical shell 31 having holes 34–38 of the same shape and positioned in the same way as in FIG. 6. The central peg 32 has a length which is greater than the radius of the sphere and is arranged to be inserted into the opening 23 in the peg 22.

Figure 8:
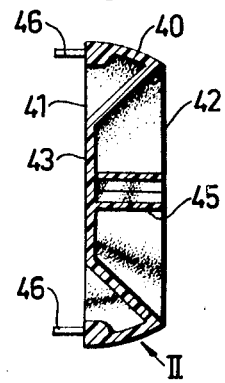
FIG. 8 shows another embodiment of the second unit.

FIGS. 8 shows a part II which is intended for use in combination with the parts I according to FIGS. 6 and 7. This part II has a spherical surface 40, two flat parallel surfaces 41 and 42 and an inner wall 43, as is the case with part II according to FIG. 2. According to FIG. 8, however, the wall 43 is provided with a peg 45 extending only in one direction and this peg 45 has a square cross section which fits the square hole on part I. In this position, therefore, part II cannot be turned in relation to part I. This therefore represents a rigid bond between the two carbon atoms, which cannot be rotated, as is the case with a double or triple bond. A similarly rigid bond is obtained if the larger flat surface 41 of part II is fitted to the flat surface of part I, which can be done if part II is provided at the periphery with two or more pegs 46 which are inserted into the openings 29 in part I according to FIG. 6.

A carbon chain can be formed in the manner shown in principle in FIG. 5, i.e. by combining several parts I and II by means of their central holes and pegs. However, since part II practically reaches the holes 5–8 on part I there is not sufficient space to be able to use these holes for the attachment of parts III representing hydrogen atoms. For this reason a carbon chain is instead assembled in the manner indicated in FIG. 9. This carbon chain consists of several parts I, designated Ia–If, and several parts II, designated IIa–IIf. The pegs 15 on parts II are inserted into the holes 7 on parts I. In this way the holes 5, 6 and 8 on each part I will be exposed so that one or two parts III can be attached in these as desired. In those parts I which form the ends of the carbon chain, all the holes 4–8 are exposed for the attachment of parts III. The parts I have been turned so that the hole 8 will face alternately upwards or downwards in the parts I. In this way a crimped or zigzag-shaped carbon chain is obtained.

FIG. 9 also shows how a branched carbon chain can be produced. The peg 15 of a part IIf is inserted into the hole 5 of part Id. A part If is attached to this part IIf. Part If can be supplemented by attaching an additional part II which is suitably attached in one of the peripheral holes 5–8. Because part IIf is attached in the hole 5 on part Id, the hole 6 on part Id is exposed so that it can be used for the attachment of a part III.

FIG. 10 illustrates a part I which can be used together with the part I according to FIG. 6. According to FIG. 10 the part I has no central peg, but is provided with two or more pegs 47 positioned at is periphery, which are inserted into holes 29 in the part I according to FIG. 6. The parts I are thus locked to prevent rotation.

The embodiment according to FIG. 11 has a central peg 48 and a peg 49 placed at the edge. It can thus be combined with the part I according to FIG. 6 so that rotation is prevented.

FIG. 12 shows an embodiment of part II which has a central peg 50 with a square cross section for cooperation with the hole in the part I according to FIG. 6, a central peg 51 with circular cross section for insertion into the opening 23 in the peg 22 on the part I according to FIG. 6, and a peg 52 placed at the periphery for cooperation with one of the openings 29 in part I according to FIG. 6.

FIG. 12 also shows how the part II can be provided with a mark, for example stripes 53 around the circumference, to indicate a double bond.

Figure 13:
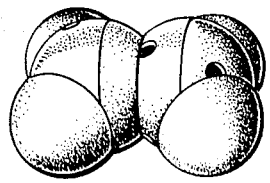
FIGS. 13 to 20 show models of various chemical compounds.
Figure 14:
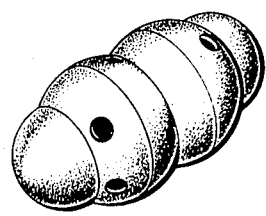

FIG. 13 illustrates an ethylene molecule $C_2H_4$ and FIG. 14 an acetylene molecule $C_2H_2$. The carbon atoms are combined in the manner shown in FIG. 5. To indicate the rigidity of the bond between the carbon atoms caused by the double and triple bond which, in compounds derived from the type ethylene (alkene derivative) inter alia, is seen as cis-trans-isomerism it can be shown that a double or triple bond exists by marking the part II with a special color, with lines according to FIG. 12, or in some other way. If the carbon atoms are designed in the manner illustrated in FIGS. 6–8, rotation is prevented between part I and part II. Also in this embodiment the presence of a double bond can be indicated by providing the construction series with a number of pieces of part II having a special marking.

Figure 15:
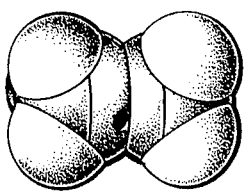

FIG. 15 illustrates an ethane molecule $C_2H_6$. Each carbon atom is linked with three hydrogen atoms, which are attached in the three equally spaced openings 5–7 on part I.

Figure 16:
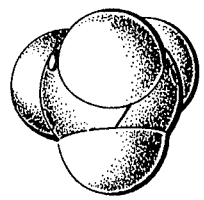

FIG. 16 illustrates a methane molecule, $CH_4$. The model consists of two parts I which are combined to form a sphere and of four parts III, which are attached in the openings 7 and 8 on the parts I, the parts I being turned so that parts III are equally spaced, i.e. are situated at the corners of a tetrahedron. For this equal spacing it is presumed that there is an angle of approximately 109° between two holes, as described in connection with FIG. 1. This positioning of the holes means, however, that a molecule model which is to represent a molecule of the type $BCl_3$, i.e. a central atom and three symmetrically surrounding atoms, will not be completely symmetrical, since complete symmetry would presume an angle of 120° between two holes. This problem can be solved by making several holes on part I so that both the angles are represented. However, it is an advantage if there are as few holes as possible in part I in order to facilitate its handling in practice. We therefore prefer to have only the five holes illustrated on part I and to position them so that the angle in question is either about 109°, or 120° or, as a compromise, about 115°. The resultant slight asymmetry can be accepted.

If the series of units of the invention are to be used for education purpose in schools of lower stages, it has been found that the five holes may cause some confusion to the pupils. Therefore, for this purpose we prefer that the series contains two different types of sphere segments as far as the spacing of the holes in concerned, namely, one type with three holes spaced at an angle of approximately 109° and one type with two holes spaced at an angle of 120°. The latter type is used mainly to represent carbon atoms with double bonds and the central peg in this type of sphere segment and the holes in its spherical surface should be shaped with a noncircular cross section to prevent rotation between two attached sphere segments. This last-mentioned type of sphere segment may suitably be given a different color, for example blackish grey, from the first-mentioned type which is suitably black. Both the types of sphere segments mentioned above may also be provided with a central hole in the spherical surface.

Figure 17:
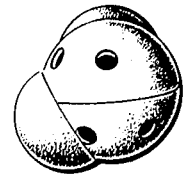

FIG. 17 shows a molecule with three atoms, composed of two parts I and two parts III. The parts III are attached in any of the peripheral holes 5–8 in the parts I. Rotation of the parts I in relation to each other thus alters the angle between the lines connecting the center of the central atom to the centers of the side atoms. This angle can be varied as desired from 180° to about 90°, when the edges of parts III touch each other, if the parts III have a radius of approximately ¾ of the radius of the parts I. By means of this ability to alter the angle the dipole moment of, for example, water and $SO_2$ can be illustrated.

Figure 18:
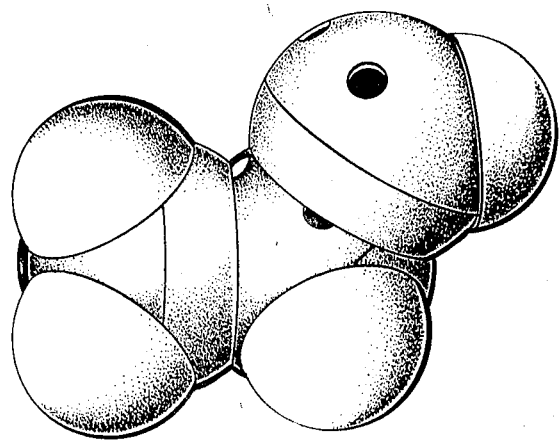

FIG. 18 illustrates ethanol, $C_2H_5OH$. The carbon atoms and the oxygen atom are formed in the manner illustrated in connection with FIG. 5, and only differ as far as color is concerned. The carbon atom is suitably black and the oxygen atom red.

Figure 19:
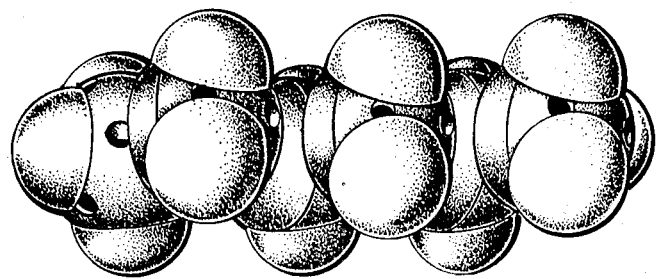

FIG. 19 illustrates hexane, $C_6H_{14}$, with a carbon chain of the type described in connection with FIG. 9.

Figure 20:
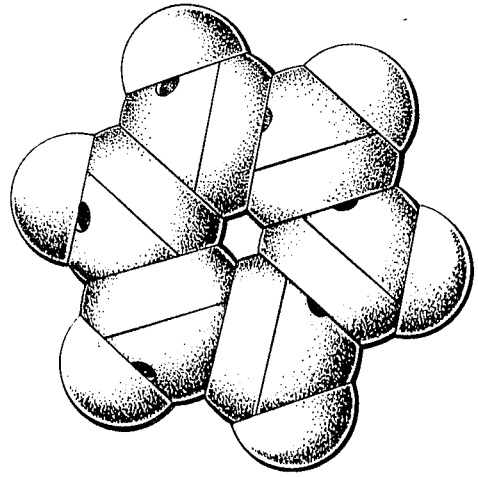

FIG. 20 illustrates benzene, $C_6H_6$. The ring-shaped carbon chain is formed by the peg 15 in each of the parts II being inserted into one of the holes 5–8 in the parts I. If the peg 15 is inserted into the hole 8, only one hole, hole 7, will be exposed so that one part III can be attached to each part I. If, on the other hand, the peg 15 is inserted into one of the holes 5–7, two holes will be exposed on each part I so that two parts III can be attached to each part I. The resultant model represents cyclohexane, $C_6H_{12}$. The freedom with which the atoms can be combined makes the illustration of the two isomeric forms of cyclohexane easy to perform.

Models of benzene derivative can be constructed by making a branch from the carbon chain shown in FIG. 20, in the manner illustrated in connection with FIG. 9.

In order to facilitate the practical assembly of molecule models it is suitable for part I to be provided with markings on the outside near the holes, so that it shall be easy to differentiate between the various holes. FIG. 4 shows how such markings may be done in order to indicate two different positioning patterns of the holes 4–8. Lines 61 extend from the hole 4 to the holes 5, 6 and 7. It is thus easy to find the holes 5–7 in which hydrogen atoms should be placed when constructing a model of, for example, ethane. The holes 7 and 8 are marked with rings 62 in order to make it easier to find the holes in which hydrogen atoms should be inserted when constructing a model of, for example, methane.

Reference shall now be made to FIGS. 21–29 which disclose a modified form of units. The modified units differ from those disclosed in FIGS. 1–20 in that the units referred to as parts I and II have been combined to form one unit which will be thus shaped as a sphere segment comprising more than a semisphere and having a recess on its flat surface. Two such sphere segments can be attached by inserting the spherical surface of one of the segments into the recess on the other segment. In this way an arbitrary number of sphere segments can be connected to form a chain. Two segments are suitably assembled in the manner described with reference to FIGS. 1–20, that is, the sphere segments are provided with a central peg and also with at least one opening in the spherical surface into which a peg belonging to another sphere segment can be inserted. The main advantage of this modified type of units is that the assembly of molecule models is facilitated.

Two sphere segments of this modified type cannot be combined to form a sphere. The modified construction series therefore contains a second unit in the form of a sphere segment comprising less than a semisphere and having the same radius as the first unit.

The modified units can be used in construction of crystal models, in which case complete spheres are used which touch each other. The positioning of the holes shown in FIGS. 1–20 enables the construction of a hexagonal crystal lattice. The modified units are also suitable for the construction of a tetragonal lattice. For this purpose the sphere segment of the modified type is provided both with a hole positioned centrally on the spherical surface and with four holes positioned on the spherical surface so that all the angles between lines from the holes to the center of the sphere segment are 90°.

The third unit described in connection with FIGS. 1–20 which normally represents a hydrogen atom, has the shape of a semisphere. The hydrogen atom of the modified type has the form of a sphere segment comprising more than a semisphere. Two such sphere segments can be put together with the flat surfaces facing each other to form a model of a hydrogen molecule, $H_2$. To make it possible to construct a model of a free hydrogen atom the modified construction series should also contain a sphere segment which comprises less than a semisphere so that one sphere segment of each type can be assembled to form a sphere.

FIG. 21 and 22 show a shell-shaped sphere segment 101 of the modified type comprising more than a semisphere. The height from the flat surface (base) to the top is approximately ¾ of the diameter, i.e. the same as the preferred dimension of the assembled first and second units in the embodiment according to FIGS. 1–20. The inner surface of the shell nearest the base is designed as a cylindrical wall 102 so that it can be removed from the mould in which it is manufactured by means of injection molding of plastic.

The sphere segment is provided with a centrally positioned circular hole 104 and three circular holes 103 which are equally spaced so that their angular distance, i.e. the angle between the lines from two holes to the center of the sphere segment, is approximately 109°, i.e. the same as the angle between the normals to two surfaces in a tetrahedron. This means that the angle $v_1$ in FIG. 21 will be 19.5°.

The sphere segment is provided with a central peg consisting of a thicker part 105 and a narrower part 106. The thicker part 105 has a hollow which is a continuation of the hole 4 in the shell 1. The narrower part has a diameter which is equal to the diameter of the hollow in the thicker part. The narrower part is provided with a longitudinal hollow.

The sphere segment according to FIG. 23 consists of a shell 107 having the same radius as the sphere segment according to FIG. 21 and is of such a size that the two sphere segments of FIGS. 21 and 23 can form a sphere. The shell 107 is provided with a central peg 108 which has a hollow forming a central hole in the shell 107 and having the same diameter as the peg 106 so that the two sphere segments can easily be attached and taken apart.

The modified sphere segment according to FIGS. 24 and 25 has three holes in its shell 110, a central hole 112 and two holes 111 lying in the same diametric plane and having an angular distance of 120°. This means that the angle $v_2$ is 30°. The holes 111, 112 have a square shape and the narrower part 114 of the central peg 113 has a square cross section and fits into the holes 111, 112. A sphere segment, not shown, fits to this sphere segment and corresponds to the sphere segment according to FIG. 23.

The two modified sphere segments shown in FIGS. 26 and 27 have the same general design as the sphere segment according to FIGS. 21–23. However, the shell 115 of the larger sphere segment is provided with only one hole 118 which is positioned centrally. The central peg 116, 117 has a hole through it and the narrower part 117 fits into the holes in the shell of the sphere segment according to FIGS. 21 and 24. These sphere segments of FIGS. 26, 27 are usually used to represent hydrogen and they are therefore suitably smaller than the sphere segment according to FIGS. 21–25 and in a contrasting color, suitably white. The height of the sphere segment according to FIG. 26 is suitably less in relation to the radius than is the case with the sphere segment according to FIGS. 21 and 24, preferably 1.2–1.3 times the radius.

FIG. 28 shows how two sphere segments according to FIG. 26 can be assembled with the help of a sphere segment according to FIG. 27 to form a model of a hydrogen molecule $H_2$. In this model the shell 119 has no function. The function of the smaller sphere segment is merely to hold the two larger sphere segments together with the help of its central hollow peg 120. In the same way, two larger sphere segments according to FIG. 21 or FIG. 24 are held together with the help of a smaller sphere segment.

FIG. 29 shows how a model of a crystal lattice can be constructed from spheres of two different sizes. The larger sphere consists of two sphere segments 123a, 123b of different sizes and the smaller sphere similarly consists of two sphere segments 124a, 124b of different sizes. Each sphere is provided with six holes 125 situated with an angular distance of 90°. The spheres are joined by means of pegs 126.

I claim:

1. Construction series for molecular models comprising, in combination, three units including a first unit, a second unit and a third unit; said first unit being in the form of a semisphere having a flat surface; said second unit being in the form of a segment of a sphere defined by a spherical surface and two flat parallel surfaces of different radii, the larger of said two flat parallel surfaces having the same radius as the flat surface of said first unit; the spherical surface of said second unit having the same radius as the spherical surface of said first unit; the smaller of said two flat parallel surfaces being formed with a recess into which a first unit can be partially inserted; said third unit having substantially the shape of a semisphere with a smaller radius than the semisphere forming said first unit, and having a flat surface formed with a recess into which a first unit can be inserted; interengageable means on each first unit providing for two first units to be joined to form a sphere; interengageable means on each second unit and each first unit providing for joining of a second unit to a first unit with their flat surfaces of equal radii in contiguous relation; interengageable means on each second unit and on each first unit providing for joining of a second unit to a first unit in which a part of the spherical surface of the first unit is seated in the recess in the second unit; and interengageable means on each third unit and on said first unit providing for mounting of a third unit on a first unit in any one of plural selected positions.

2. Construction series according to claim 1 characterized in that the thickness of the spherical segment is approximately half the radius of the sphere surface.

3. Construction series according to claim 1, characterized in that the sphere segment has a wall which substantially coincides with its larger flat parallel surface and that this wall is provided with a peg extending centrally in both directions from the wall, one part of the peg being arranged to cooperate with a hole in the spherical surface of the first unit, and the other part of the peg being arranged to cooperate with a centrally positioned hole in the flat surface of said semisphere.

4. Construction series according to claim 1, characterized in that the third unit is shell-shaped and provided on the inside with a central peg which is arranged to cooperate with holes in the spherical surface of the first unit.

5. Construction series according to claim 1, characterized in that the first unit is shell-shaped and provided on the inside with a centrally positioned socket, two such units being assembled by means of a peg which is inserted into the sockets of the two units.

6. Construction series according to claim 1, characterized in that the first unit are shell-shaped and provided on the inside with centrally positioned assembly means of two types, the first being a socket and the second a peg to cooperate with said socket.

7. Construction series according to claim 1, characterized in that the first unit is provided on its spherical surface with holes to cooperate with pegs belonging to the second and third units, these holes comprising one central hole and three equally spaced holes situated nearer to the periphery of the semisphere.

8. Construction series according to claim 7, characterized in that the spherical surface has an additional hole, situated between two of said three holes and preferably at the same distance from the periphery of the semisphere as said three holes.

9. Construction series according to claim 1, characterized in that the radius of the third unit is ⅔–¾ of the radius of the first unit.

10. Construction series according to claim 1 characterized in that holes and pegs, serving as assembly means, have a noncircular cross section, in order to prevent rotation between two assembled units.

11. Construction series according to claim 1 characterized in that the first unit and the second unit are provided with holes and pegs arranged at the periphery, in order to prevent rotation between two assembled units.

12. Construction series according to claim 1 characterized in that the second unit is provided with a mark, to indicate a double or triple bond between two adjacent atoms.

13. Construction series according to claim 1, characterized in that each first unit is formed with apertures forming part of said interengageable means, and is provided with marks near said apertures in order to indicate two feasible positioning patterns for atoms bound, for example, to the carbon atom.

14. Construction series for molecular models comprising, in combination, a first unit in the form of a spherical segment having a spherical surface of having a size substantially greater than a semisphere, and having a flat surface formed with a recess on such flat surface for receiving a portion of a spherical surface of another unit; a joining member, in the form of a peg, extending from the bottom of said recess centrally of said recess and approximately to said flat surface; the spherical surface of said first unit being formed with at least one aperture having a cross section corresponding to that of the cross section of said peg and a second unit substantially identical to said first unit, whereby two units can be joined by inserting the peg of one unit into the aperture of the other unit.

15. Construction series according to claim 14, characterized in that the spherical segment has a bore running completely through the central peg.

16. Construction series according to claim 14, characterized in that the first unit has a central peg having a thicker part provided with a longitudinal bores and a narrower part which fits into the bores in the thicker part.

17. Construction series according to claim 16, characterized in that the first unit is constructed as a shell with the central peg extending from the top of the shell substantially to the flat surface plane.

18. Construction series for molecular models, as claimed in claim 25, including a third unit in the form of a spherical segment having a size less than a semisphere and having the same radius as said first unit; each third unit having means cooperable with the peg of a first unit to join a first and third unit to form a sphere.

19. Construction series according to claim 14, in which said first unit is formed with three apertures so positioned that the angle between radii of said spherical segment intersecting adjacent apertures is substantially 109°.

20. Construction series, according to claim 14, in which said first unit is formed with two apertures in its spherical surface so positioned that the angle between radii of said spherical segment intersecting said two apertures is 120°.

21. Construction series, according to claim 14, particularly intended for constructing models of crystals, characterized in that the first unit is formed with a hole positioned centrally of its spherical surface and with four additional holes in its spherical surface, with the angle between radii intersecting said additional hole being 90°.